(12) United States Patent
Zhao

(10) Patent No.: US 10,773,478 B1
(45) Date of Patent: Sep. 15, 2020

(54) TESTING DEVICE

(71) Applicant: TRIPLE WIN TECHNOLOGY(SHENZHEN) CO.LTD., Shenzhen (CN)

(72) Inventor: Ying-Quan Zhao, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/546,586

(22) Filed: Aug. 21, 2019

(30) Foreign Application Priority Data

Jul. 16, 2019 (CN) .......................... 2019 1 0642075

(51) Int. Cl.
| | |
|---|---|
| *G01N 21/88* | (2006.01) |
| *B29D 11/00* | (2006.01) |
| *B23K 37/04* | (2006.01) |
| *G03B 43/00* | (2006.01) |
| *G01B 9/02* | (2006.01) |

(52) U.S. Cl.
CPC .......... *B29D 11/0098* (2013.01); *B23K 37/04* (2013.01); *G03B 43/00* (2013.01); *G01B 9/02024* (2013.01)

(58) Field of Classification Search
CPC ............. G01M 11/0221; G01M 11/30; G01M 11/0228; G01M 11/0242; G01M 11/0285; G01B 11/2522; G01B 11/252; G01N 2021/9583; G01N 21/958; G02B 7/02; G02B 7/003; G02B 7/00
USPC .......................... 356/244, 124–127, 614–623
See application file for complete search history.

(56) References Cited

U.S. PATENT DOCUMENTS

| | | | | |
|---|---|---|---|---|
| 4,815,846 | A * | 3/1989 | Wodis | G01M 11/0214 356/124 |
| 5,004,399 | A * | 4/1991 | Sullivan | B25J 15/00 414/225.01 |
| 6,468,282 | B2 * | 10/2002 | Kikuchi | A61F 2/1664 606/107 |
| 8,502,965 | B2 * | 8/2013 | Kuo | G03B 43/00 356/124 |
| 8,773,539 | B2 * | 7/2014 | Lee | G03B 3/10 348/187 |
| 8,958,907 | B2 * | 2/2015 | Saeki | H01L 21/67742 318/567 |
| 9,108,368 | B2 * | 8/2015 | Biel | B29D 11/00125 |
| 2005/0073677 | A1 * | 4/2005 | Bergendahl | G01M 11/0214 356/244 |

\* cited by examiner

*Primary Examiner* — Hoa Q Pham
(74) *Attorney, Agent, or Firm* — ScienBiziP, P.C.

(57) ABSTRACT

A testing device includes a positioning assembly and a testing assembly. The positioning assembly positions a workpiece. The testing assembly tests the workpiece. The positioning assembly includes a mounting seat defining a receiving slot for receiving and positioning the workpiece. The mounting seat includes a first positioning surface and a second positioning surface. The positioning assembly includes a side pusher configured to move toward the receiving slot. The side pusher includes a first pushing surface and a second pushing surface. When the side pusher is driven to move toward the receiving slot, the first pushing surface and the second pushing surface push two surfaces of the workpiece to make opposite two surfaces of the workpiece come in contact with the first positioning surface and the second positioning surface to position the workpiece in the receiving slot.

20 Claims, 5 Drawing Sheets

TESTING DEVICE

FIELD

The subject matter herein generally relates to testing devices, and more particularly to a testing device for automatically positioning and testing a workpiece.

BACKGROUND

Generally, before a lens of a camera can be tested, the lens must be accurately positioned for testing. However, the testing device in the related art has low automation and low efficiency and requires large amounts of manpower.

BRIEF DESCRIPTION OF THE DRAWINGS

Implementations of the present disclosure will now be described, by way of embodiments, with reference to the attached figures.

DETAILED DESCRIPTION

Figure 1:
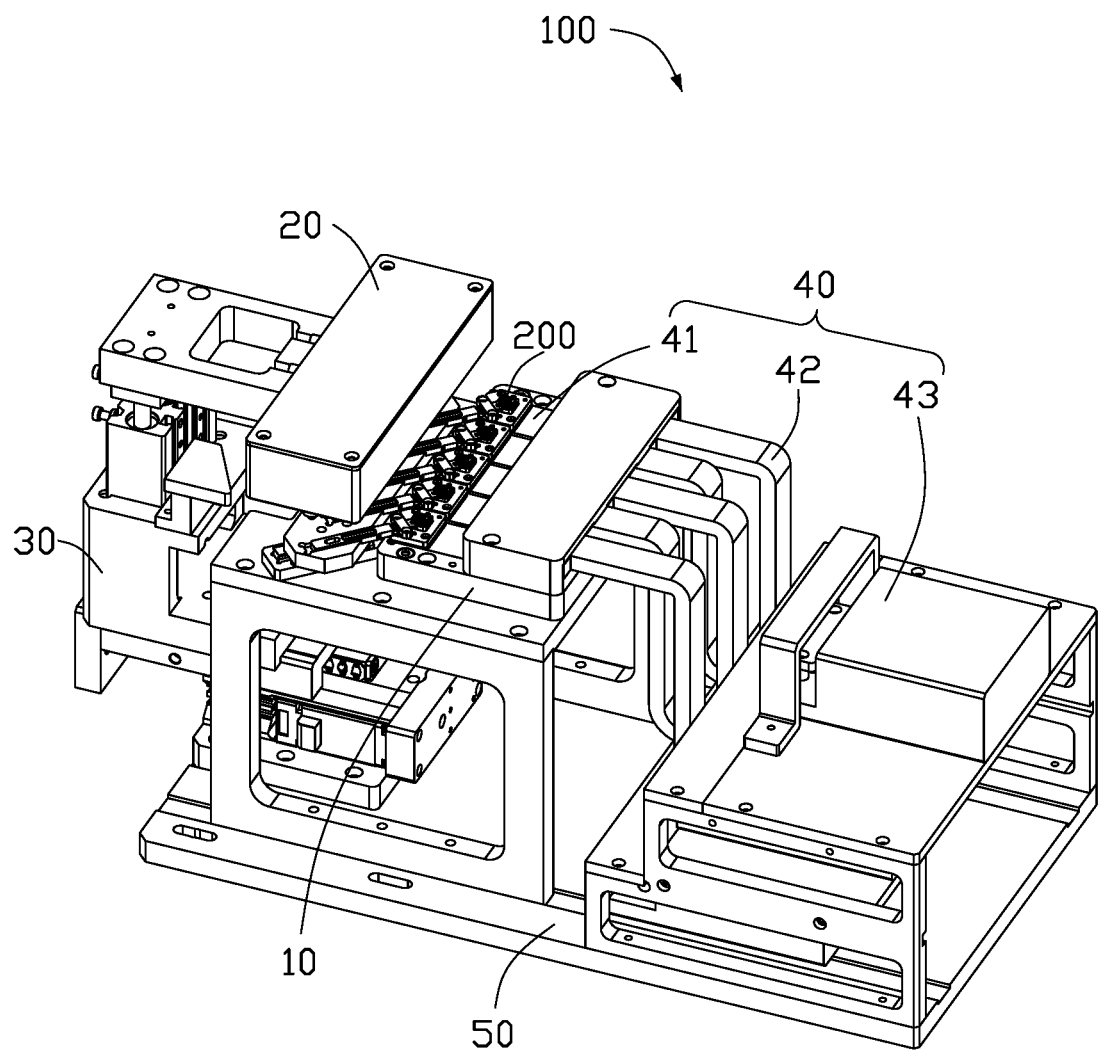
FIG. 1 is an assembled, isometric view of an embodiment of a testing device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a testing device 100 for testing a workpiece 200. In one embodiment, the workpiece 200 is a lens of a camera. The testing device 100 includes a positioning assembly 10, a light source assembly 20, a driving assembly 30, a testing assembly 40, and a base 50. The base 50 is placed on the ground or a flat surface. The positioning assembly 10, the driving assembly 30, and the testing assembly 40 are fixed on the base 50. The light source assembly 20 is mounted on the driving assembly 30.

Figure 2:
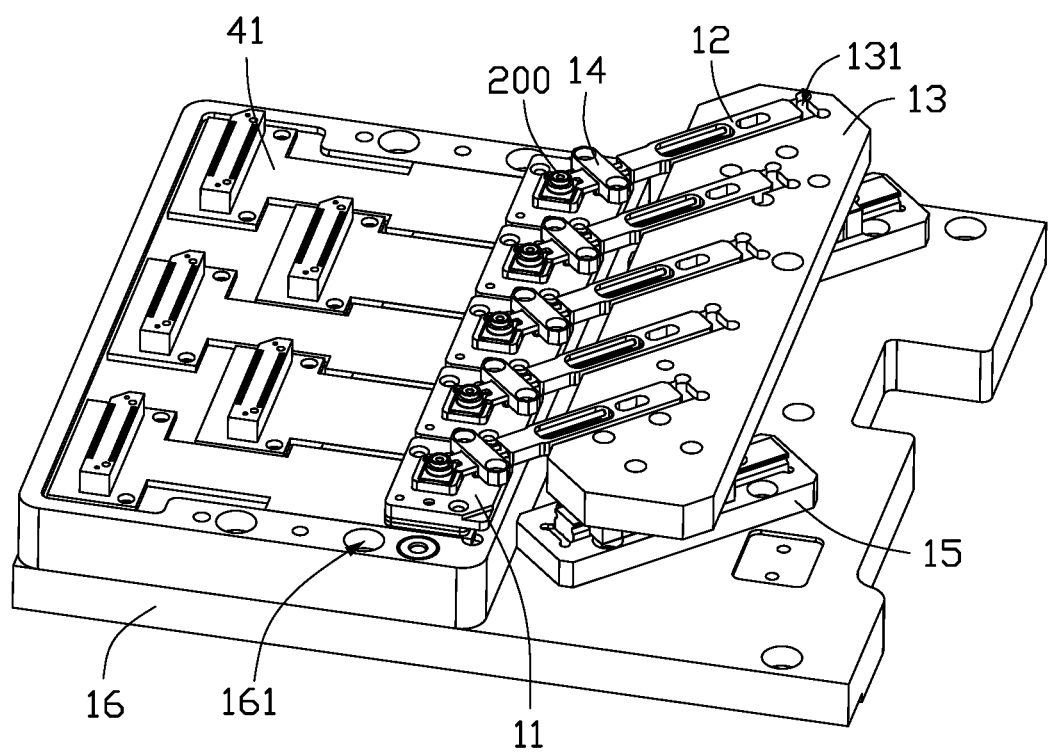
FIG. 2 is an isometric view of a positioning assembly and a processor of the testing device in FIG. 1.

As shown in FIGS. 1 and 2, the positioning assembly 10 positions the workpiece 200. The testing assembly 40 is located on the positioning assembly 10 for testing the workpiece 200. The positioning assembly 10 includes a mounting seat 11, a side pusher 12, a pushing member 13, a guiding member 14, a sliding rail 15, and a positioning base 16. The positioning base 16 is mounted on the base 50. The testing assembly 40 includes a processor 41, a high frequency signal extension line 42, a test box 43, and a photosensitive member 44 (shown in FIG. 3). The photosensitive member 44 is located directly under the mounting seat 11 for testing, and the processor 41 is located under the photosensitive member 44 for transmitting data. A first end of the processor 41 is mounted on the positioning assembly 10 to receive test data, and a second end of the processor 41 is connected to the test box 43 through the high frequency signal extension line 42 for transmitting and processing test data.

Figure 3:
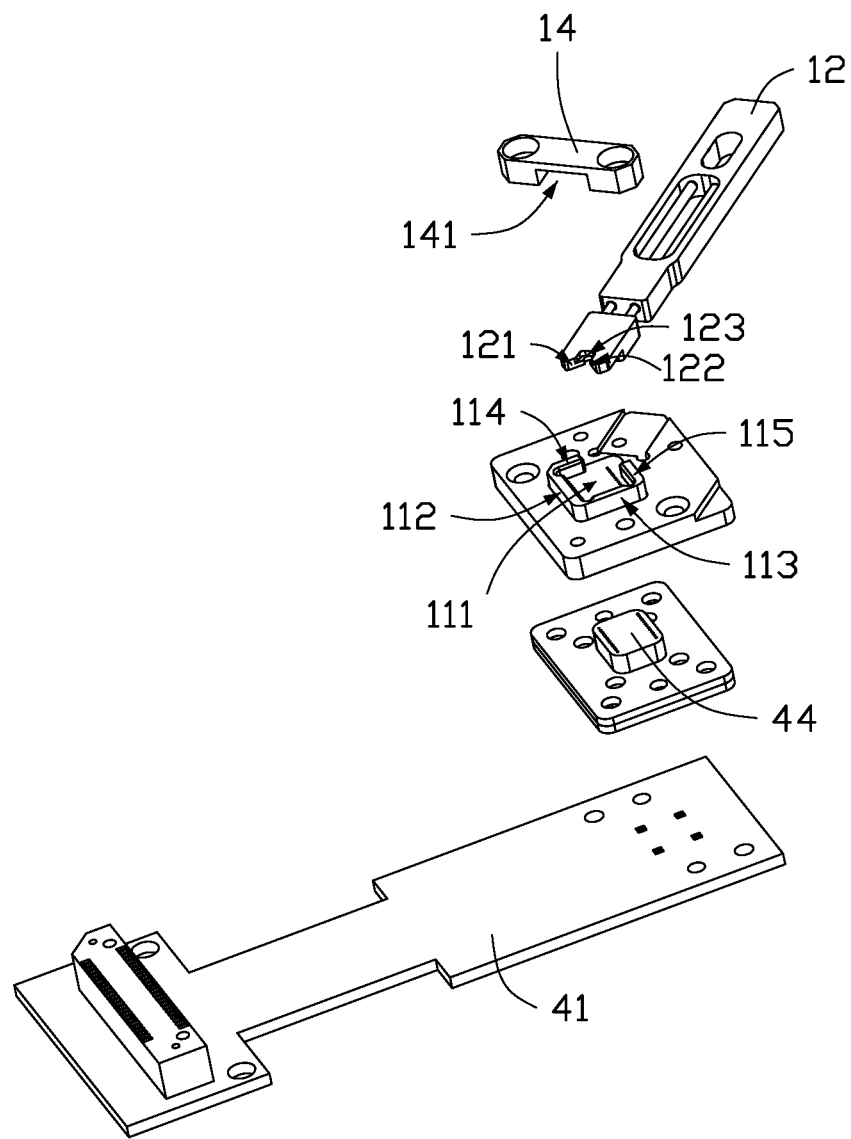
FIG. 3 is a partial exploded view of the positioning assembly.

As shown in FIG. 3, in one embodiment, the mounting seat 11 defines a receiving slot 111. The receiving slot 111 has a substantially rectangular shape corresponding to a shape of the workpiece 200. A volume of the receiving slot 111 is slightly larger than a volume of the workpiece 200 for receiving the workpiece 200 to align the workpiece 200 with the photosensitive member 44 for testing. The mounting seat 11 includes a first positioning surface 112 and a second positioning surface 113 connected to the first positioning surface 112. When the workpiece 200 is positioned, two sides of the workpiece 200 are in full contact with the first positioning surface 112 and the second positioning surface 113.

The sliding rail 15 is located on the base 50. The positioning assembly 10 includes a driver (not shown) that drives the pushing member 13 to move along the sliding rail 15. The pushing member 13 defines a side pusher slot 131 receiving the side pusher 12. The side pusher slot 131 extends along a same direction as a sliding direction of the sliding rail 15. The guiding member 14 is fixed to the mounting seat 11 and guides a moving direction of the side pusher 12. The guiding member 14 defines a through hole 141, and the side pusher 12 is movably received through the through hole 141. One end of the side pusher 12 forms a first pushing surface 121 and a second pushing surface 122 to contact corresponding surfaces of the workpiece 200 to position the workpiece 200 with the first positioning surface 112 and the second positioning surface 113. The side pusher 12 defines a clearance slot 123. The clearance slot 123 is located between the first abutting surface 121 and the second abutting surface 122, and a corner of the workpiece 200 passes through the clearance slot 123 when the first pushing surface 121 and the second pushing surface 122 push the workpiece 200. The mounting seat 11 further includes a first sidewall 114 connected to the first positioning surface 112 and a second sidewall 115 connected to the second positioning surface 113. When the side pusher 12 moves toward the mounting seat 11, the first sidewall 114 and the second sidewall 115 resist against the side pusher 12 to prevent the side pusher 12 from moving further toward the mounting seat 11. The positioning base 16 includes a plurality of positioning holes 161 for positioning the light source assembly 20.

Figure 4:
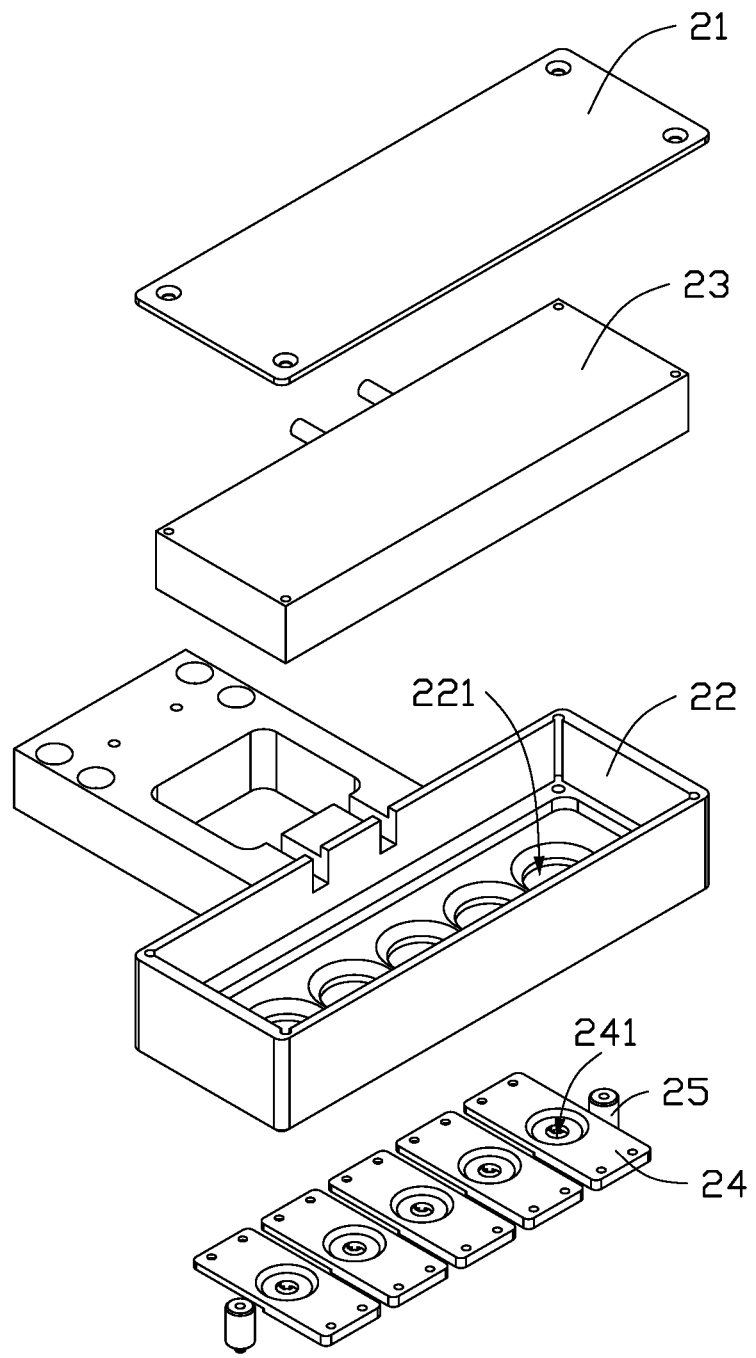
FIG. 4 is an exploded view of a light source assembly of the testing device.

As shown in FIG. 4, the light source assembly 20 includes a cover 21, a casing 22, a light source 23, a baffle 24, and a positioning pin 25. The casing 22 is mounted on the driving assembly 30. The light source 23 is received inside the casing 22, and the cover 21 covers the light source 23. A bottom of the casing 22 defines a light hole 221 for transmitting light. The baffle 24 defines a light source hole 241 for transmitting light. The light source hole 241 is aligned with the light hole 221 for transmitting light generated by the light source 23 to the workpiece 200 for testing. The positioning pin 25 has a size corresponding to a size of the positioning hole 161 of the positioning base 16. The positioning pin 25 is inserted into the positioning hole 161 for positioning the light source assembly 20.

Figure 5:
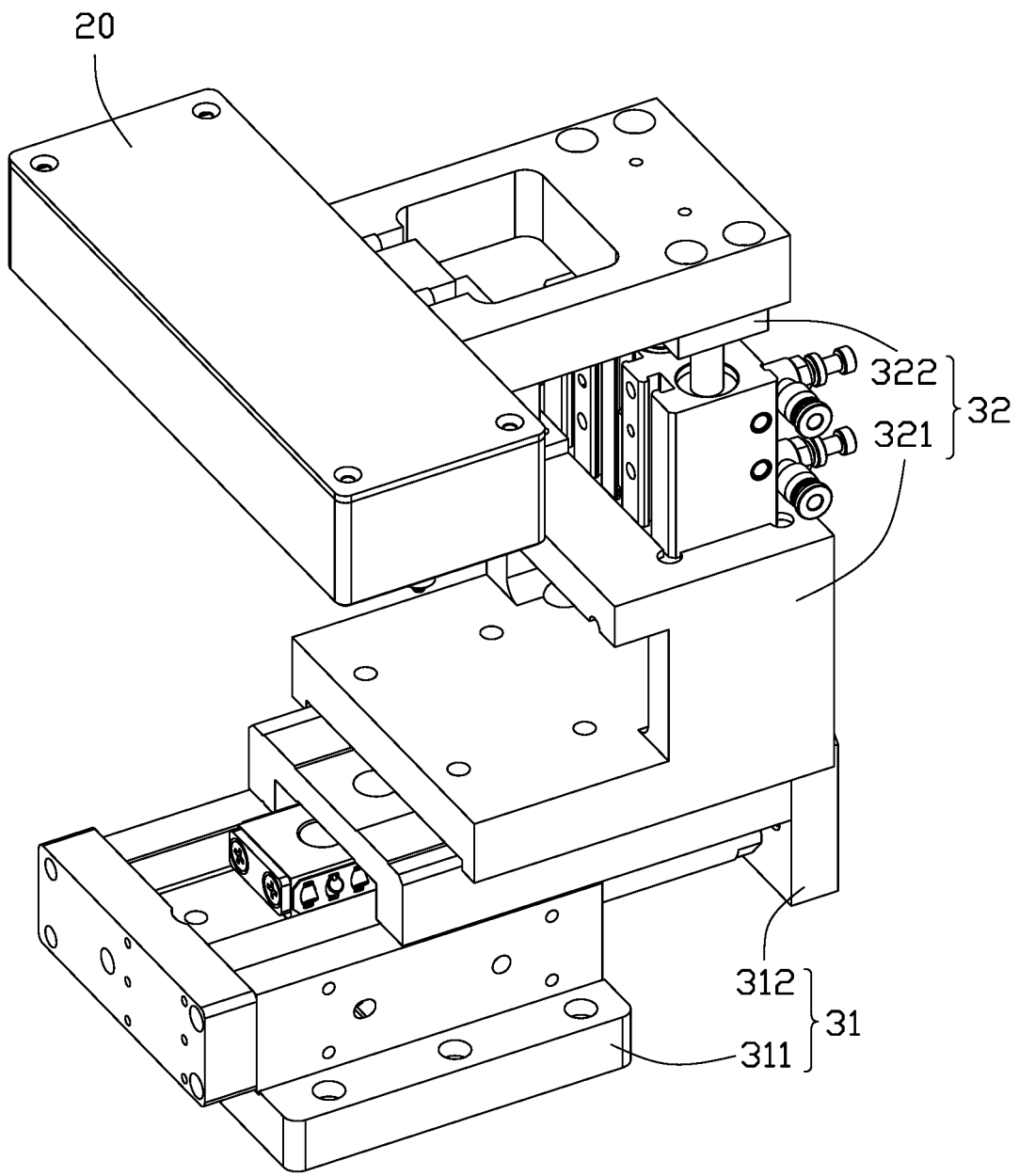
FIG. 5 is an isometric view of a driving assembly of the testing device.

As shown in FIG. 5, the driving assembly 30 drives the light source assembly 20 to cover or move away from the positioning assembly 10. The driving assembly 30 includes a first driving member 31 and a second driving member 32. The first driving member 31 includes a first driving base 311 and a first moving block 312, and the second driving member 32 includes a second driving base 321 and a second moving block 322. The first driving base 311 is fixed on the base 50 and is located between the base 50 and the positioning base 16 to reduce an occupied space, and the first moving block 312 is movably mounted to the first driving base 311. The second driving base 321 is fixed to the first moving block 312, and the second moving block 322 is movably mounted to the second driving base 321.

The casing 22 of the light supply unit 20 is mounted on the second moving block 322. The first driving base 311 drives the first moving block 312 to move in a first direction. The second driving base 321, the second moving block 322, and the light source assembly 20 move in the first direction with the first moving block 312. The second driving base 321 drives the second moving block 322 to move in a second direction. The light source assembly 20 moves with the second moving block 322 in the second direction. In one embodiment, the first direction is perpendicular to the second direction. The first direction may be a horizontal direction, and the second direction may be a vertical direction.

In use, the workpiece 200 is placed in the receiving slot 111 of the mounting seat 11, and the driver drives the pushing member 13 to move along the sliding rail 15. The pushing member 13 pushes the side pusher 12, and the first pushing surface 121 and the second pushing surface 122 of the side pusher 12 urge the workpiece 200 to fully contact the first positioning surface 112 and the second positioning surface 113 to position the workpiece 200. After positioning the workpiece 200, the first driving base 311 of the driving assembly 30 drives the first moving block 312 to move along the first direction toward the workpiece 200, and the second driving base 321 drives the second moving block 322 to move along the second direction toward the workpiece 200, so that the light source assembly 20 is positioned above the workpiece 200 and the mounting seat 11. Then, the positioning pin 25 is inserted into the positioning hole 161 to position the light source assembly 20. The photosensitive member 44 receives the light from the light source 23 and performs testing. The processor 41 receives test data from the photosensitive member 44 and transmits the test data is transmitted to the test box 43 through the high frequency signal extension line 42 for processing the data. After testing is complete, the first driving base 311 of the driving assembly 30 drives the first moving block 312 to move along the first direction away from the workpiece 200, and the second driving base 321 drives the second moving block 322 to move along the second direction away from the workpiece 200, thereby driving the light source assembly 20 to move away from the mounting seat 11 and the workpiece 200. The pushing member 13 is driven to move along the sliding rail 15 to drive the side pusher 12 to release the workpiece 200, and then the workpiece 200 can be removed.

In the illustrated embodiment, there are five mounting seats 11, five side pushers 12, and five guiding members 14 for simultaneously testing five workpieces 200. In other embodiments, there may be other quantities of mounting seats 11, side pushers 12, and guiding members 14.

In other embodiments, the sliding rail 15, the guiding member 14, and the pushing member 13 can be omitted, so that the side pusher 12 is driven directly by the driving device (not shown). In other embodiments, the first sidewall 114, the second sidewall 115, and the clearance slot 123 can be omitted, as long as the first pushing surface 121 and the second pushing surface 122 fully contact the workpiece 200. The driving assembly 30 can also drive the light source assembly 20 in other manners.

Compared with the related art, the side pusher 12, the first positioning surface 112, and the second positioning surface 113 facilitate positioning of the workpiece 200, and the driving assembly 30 and the light source assembly 20 provide automatic light supply testing. Requirements of low, medium, and high image lighting rate are met, and multiple workpieces 200 can be tested at one time, thereby improving testing efficiency.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A testing device comprising:
   a positioning assembly configured to position a workpiece; and
   a testing assembly configured to test the workpiece; wherein:
   the positioning assembly comprises a mounting seat defining a receiving slot configured for receiving and positioning the workpiece;
   the mounting seat comprises a first positioning surface and a second positioning surface coupled to the first positioning surface;
   the positioning assembly comprises a side pusher configured to be driven to move toward the receiving slot;
   the side pusher comprises a first pushing surface and a second pushing surface coupled to the first pushing surface; and
   when the side pusher is driven to move toward the receiving slot, the first pushing surface and the second pushing surface respectively push two surfaces of the workpiece to make opposite two surfaces of the workpiece respectively become in contact with the first positioning surface and the second positioning surface to position the workpiece in the receiving slot.

2. The testing device of claim 1, wherein:
   the positioning assembly further comprises a guiding member fixed on the mounting seat;

the guiding member defines a through hole; and
the side pusher is movably received through the through hole.

3. The testing device of claim 1, wherein:
the positioning assembly further comprises a sliding rail and a pushing member;
the side pusher is mounted to the pushing member;
the pushing member is movably mounted on the sliding rail;
the pushing member is driven to move along the sliding rail.

4. The testing device of claim 1, wherein:
the mounting seat further comprises a first sidewall and a second sidewall;
the first sidewall is connected to the first positioning surface, and the second sidewall is connected to the second positioning surface; and
when the side pusher is driven to move toward the mounting seat, the first sidewall and the second sidewall resist against the side pusher to prevent the side pusher from moving further toward the mounting seat.

5. The testing device of claim 1, wherein:
the side pusher defines a clearance hole between the first pushing surface and the second pushing surface;
the clearance hole receives a corner of the workpiece when the side pusher pushes the workpiece.

6. The testing device of claim 1, further comprising a light source assembly and a photosensitive member, wherein:
the light source assembly and the photosensitive member are respectively mounted on opposite sides of the mounting seat;
the light source assembly emits light to the workpiece;
the photosensitive member detects whether light passes through the workpiece to test the workpiece.

7. The testing device of claim 6, further comprising a driving assembly, wherein:
the driving assembly comprises a first driving member and a second driving member;
the first driving member comprises a first driving base and a first moving block;
the second driving member comprises a second driving base and a second moving block;
the first moving block is movably mounted to the first driving base;
the second driving base is fixed to the first moving block, and the second moving block is movably mounted to the second driving base;
the light source assembly is mounted on the second moving block;
the driving assembly drives the light source assembly to move toward or away from the workpiece.

8. The testing device of claim 7, wherein:
the light source assembly comprises a cover, a casing, a light source, and a baffle;
the casing is mounted on the second driving block;
the light source is received inside the casing;
the cover covers the casing;
a bottom of the casing defines a light hole for transmitting light;
the baffle defines a light source hole;
the light source hole is aligned with the light hole.

9. The testing device of claim 8, wherein:
the light source assembly further comprises a positioning pin;
the positioning assembly defines a positioning hole;
the positioning pin is mounted on the casing;
the driving assembly drives the positioning pin to be inserted into the positioning hole to align the light source hole with the workpiece.

10. The testing device of claim 6, wherein:
the testing assembly comprises a processor coupled to the photosensitive member;
the processor is configured to receive test data from the photosensitive member.

11. A testing device comprising:
a positioning assembly configured to position a workpiece;
a light source assembly configured to emit light to the workpiece;
a driving assembly configured to drive the light source assembly to move toward or away from the workpiece; and
a testing assembly configured to test the workpiece;
wherein:
the positioning assembly comprises a mounting seat defining a receiving slot for receiving and positioning the workpiece;
the mounting seat comprises a first positioning surface and a second positioning surface coupled to the first positioning surface;
the positioning assembly comprises a side pusher configured to be driven to move toward the receiving slot;
the side pusher comprises a first pushing surface and a second pushing surface coupled to the first pushing surface; and
when the side pusher is driven to move toward the receiving slot, the first pushing surface and the second pushing surface respectively push two surfaces of the workpiece to make opposite two surfaces of the workpiece respectively become in contact with the first positioning surface and the second positioning surface to position the workpiece in the receiving slot.

12. The testing device of claim 11, wherein:
the positioning assembly further comprises a guiding member fixed on the mounting seat;
the guiding member defines a through hole; and
the side pusher is movably received through the through hole.

13. The testing device of claim 12, wherein:
the positioning assembly further comprises a sliding rail and a pushing member;
the side pusher is mounted to the pushing member;
the pushing member is movably mounted on the sliding rail;
the pushing member is driven to move along the sliding rail.

14. The testing device of claim 13, wherein:
the mounting seat further comprises a first sidewall and a second sidewall;
the first sidewall is connected to the first positioning surface, and the second sidewall is connected to the second positioning surface; and
when the side pusher is driven to move toward the mounting seat, the first sidewall and the second sidewall resist against the side pusher to prevent the side pusher from moving further toward the mounting seat.

15. The testing device of claim 14, wherein:
the side pusher defines a clearance hole between the first pushing surface and the second pushing surface;
the clearance hole receives a corner of the workpiece when the side pusher pushes the workpiece.

16. The testing device of claim 15, further comprising a photosensitive member, wherein:
- the light source assembly and the photosensitive member are respectively mounted on opposite sides of the mounting seat;
- the light source assembly emits light to the workpiece;
- the photosensitive member detects whether the light passes through the workpiece to test the workpiece.

17. The testing device of claim 16, wherein:
- the driving assembly comprises a first driving member and a second driving member;
- the first driving member comprises a first driving base and a first moving block;
- the second driving member comprises a second driving base and a second moving block;
- the first moving block is movably mounted to the first driving base;
- the second driving base is fixed to the first moving block, and the second moving block is movably mounted to the second driving base;
- the light source assembly is mounted on the second moving block;
- the driving assembly drives the light source assembly to move toward or away from the workpiece.

18. The testing device of claim 17, wherein:
- the light source assembly comprises a cover, a casing, a light source, and a baffle;
- the casing is mounted on the second driving block;
- the light source is received inside the casing;
- the cover covers the casing;
- a bottom of the casing defines a light hole for transmitting light;
- the baffle defines a light source hole;
- the light source hole is aligned with the light hole.

19. The testing device of claim 1, wherein:
- the light source assembly further comprises a positioning pin;
- the positioning assembly defines a positioning hole;
- the positioning pin is mounted on the casing;
- the driving assembly drives the positioning pin to be inserted into the positioning hole to align the light source hole with the workpiece.

20. The testing device of claim 19, wherein:
- the testing assembly comprises a processor coupled to the photosensitive member;
- the processor is configured to receive test data from the photosensitive member.

\* \* \* \* \*